United States Patent [19]

Czaja

[11] Patent Number: 4,885,913
[45] Date of Patent: Dec. 12, 1989

[54] OPEN CYCLE LATENT HEAT ENGINE

[76] Inventor: Julius Czaja, 229 Village Blvd. S., Baldwinsville, N.Y. 13027

[21] Appl. No.: 231,898

[22] Filed: Aug. 15, 1988

[51] Int. Cl.$^4$ .............................................. F01K 25/06
[52] U.S. Cl. ......................................... 60/673; 60/649
[58] Field of Search ................ 60/641.11, 641.12, 675, 60/721, 649, 673, 674

[56] References Cited

U.S. PATENT DOCUMENTS

| | | | |
|---|---|---|---|
| 4,106,294 | 8/1978 | Czaja | 60/649 |
| 4,367,627 | 1/1983 | Pretini | 60/641.12 |
| 4,475,342 | 10/1984 | Assaf | 60/641.12 |

*Primary Examiner*—Stephen F. Husar
*Attorney, Agent, or Firm*—Stonebraker, Shepard & Stephens

[57] ABSTRACT

An open cycle latent heat engine has an elevator (10) rising preferably several thousand feet from a lower level entrance (12) to a higher level exit (13). Warm water vapor is input at the lower level of the elevator passageway (10) to cause moist air to rise, and a condensate remover (17) in an upper region of the elevator passageway removes condensate from the adiabatically expanded air. A compressor passageway (20) descending from exit (13) of the elevator passageway to the region of elevator passageway entrance (12) receives a portion of the air discharged from the exit and adiabatically and gravitationally compresses the dry air descending in the compressor passageway. An ejector arranged in the lower region of the compressor passageway has a nozzle (15) receiving ambient atmosphere flowing into the entrance of elevator passageway (10), where subatmospheric pressure air from compressor passageway (20) merges to help sustain the flow through ejector nozzle (15). Energy can be extracted from the air flowing through the ejector nozzle.

4 Claims, 3 Drawing Sheets

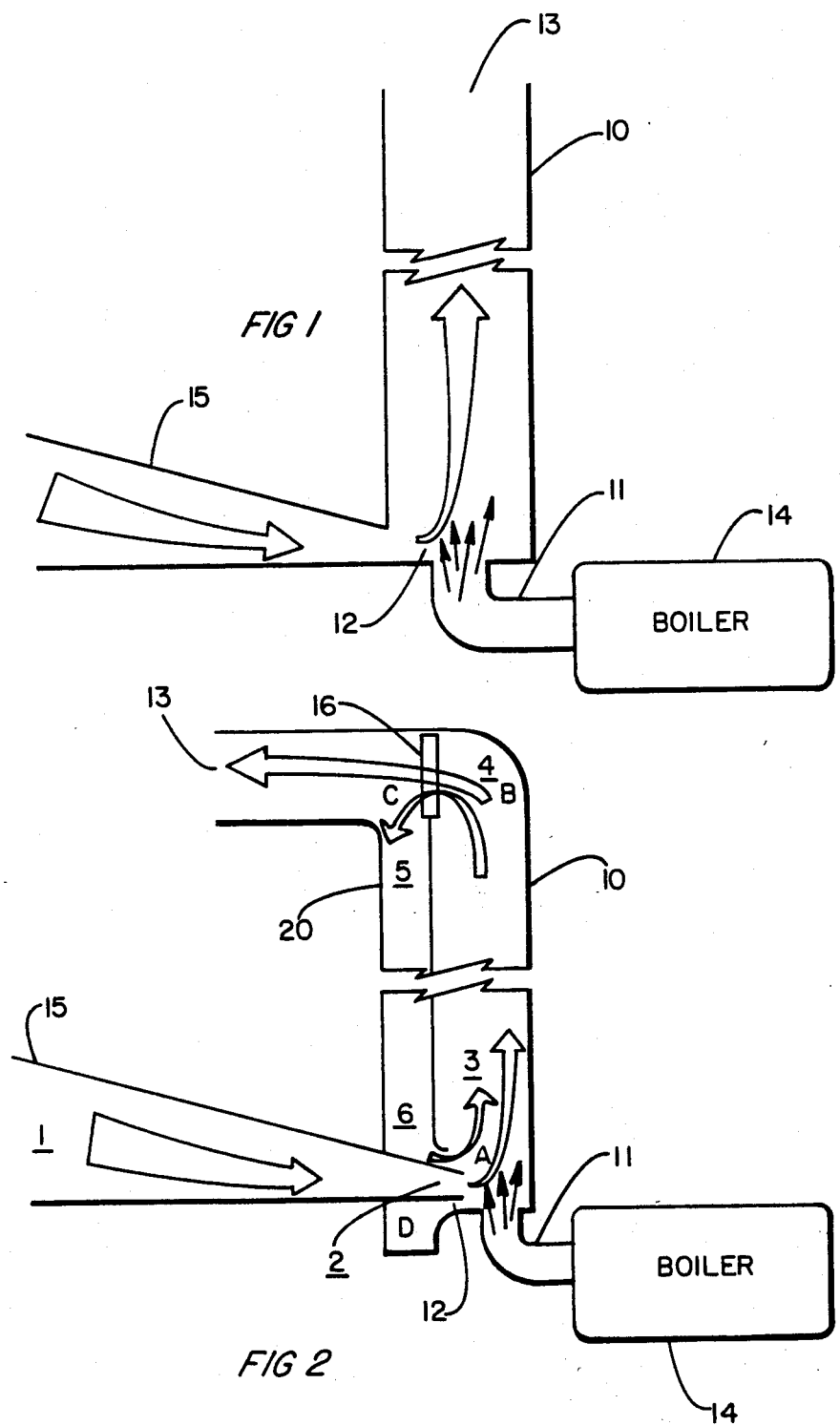

OPEN CYCLE LATENT HEAT ENGINE

BACKGROUND

An analysis of hurricanes as heat engines has inspired the invention of this application. A basic understanding of the thermodynamics of hurricanes will also help in understanding my open cycle latent heat engine, which simulates the action of a hurricane within a confinement designed for that purpose.

The energy inputs to a hurricane include trade winds blowing over the water, and sunlight warming the water and the air above it, and evaporating water vapor from the ocean into the atmosphere. When the right conditions for a hurricane occur, the winds begin swirling moist air around a low pressure center forming the eye of the hurricane. The moist and swirling air rises around the eye wall of the hurricane and fans outward at the top of the hurricane. This condenses water vapor to form rain, leaving the air at the upper regions of the hurricane in a drier state. Some of this air is cut off and blown away from the hurricane by high altitude winds, and some of it settles into the eye of the hurricane, where it descends gravitationally. The adiabatic compression of the dry air in the eye of the hurricane forms at sea level a dry air at a substantially lower pressure than the moist air surrounding the hurricane eye. Evaporation of sea water at the bottom of the eye saturates the dry air as it drops to lower altitudes. This adds power to the swirling winds at the throat of the hurricane to drive the moist air inward in an ascending spiral, producing more rain as the water vapor condenses, and keeping the hurricane alive.

My open cycle latent heat engine takes advantage of some of the phenomena at work in a hurricane. It uses adiabatically expanding and rising moist air and adiabatically compressing and descending dry air to form an air flow cycle similar to the one at work in a hurricane. For the swirling winds at the throat of the hurricane, it substitutes an ejector drawing in sea level air, with the assistance of the gravitationally compressed, low pressure dry air. Once an air flow cycle is established, the flow can be directed through a turbo generator to extract energy from the engine.

My open cycle latent heat engine is intended to exploit naturally occurring phenomena such as the tendency of a column of low density, moist air to expand adiabatically and rise, and the subatmospheric sea level pressure produced by a column of gravitationally descending and adiabatically compressed dry air. Once the basic principles of operation of my open cycle latent heat engine are understood, there are many ways it can be put to use for producing energy and for moving large quantities of air.

SUMMARY OF THE INVENTION

My open cycle latent heat engine uses an elevator passageway having an entrance at a lower level and an exit at a higher level, with preferably several thousand feet between the two levels. Warm water vapor is input into the lower level of the elevator passageway to produce an adiabatic expansion of moist air rising in the elevator passageway. A condensate remover in the region of the exit from the elevator passageway withdraws condensed water from the cooled air at the higher elevation so that the air there contains a smaller mass of water per pound of air than at the previous lower level. A substantial portion of the rising air is discharged to atmosphere at the higher level, but a portion of this air is directed into a compressor passageway that descends from the region of the elevator exit to the region of the elevator entrance. The air descending gravitationally in the compressor passageway is adiabatically compressed to a pressure that is below atmospheric at the bottom of the compressor passageway. There, an ejector is arranged with a nozzle that receives ambient atmosphere flowing through the ejector and into the entrance of the elevator passageway. The dry compressed air in the compressor passageway communicates with the outlet of the ejector nozzle to help sustain the flow of ambient atmosphere through the ejector nozzle, and the combined flow of ambient and compressor passageway air from the ejector is directed into the entrance of the elevator passageway, where it rises. Energy can then be extracted, preferably by a turbo generator, from the air circulation flow established by the elevator passageway, the compressor passageway, and the ejector.

DRAWINGS

FIG. 1 is a schematic elevational view of an elevator passageway used in my open cycle latent heat engine.

FIG. 2 is a schematic elevational view of a compressor passageway and ejector added to the elevator passageway of FIG. 1 of my open cycle latent heat engine.

DETAILED DESCRIPTION

Figure 3:
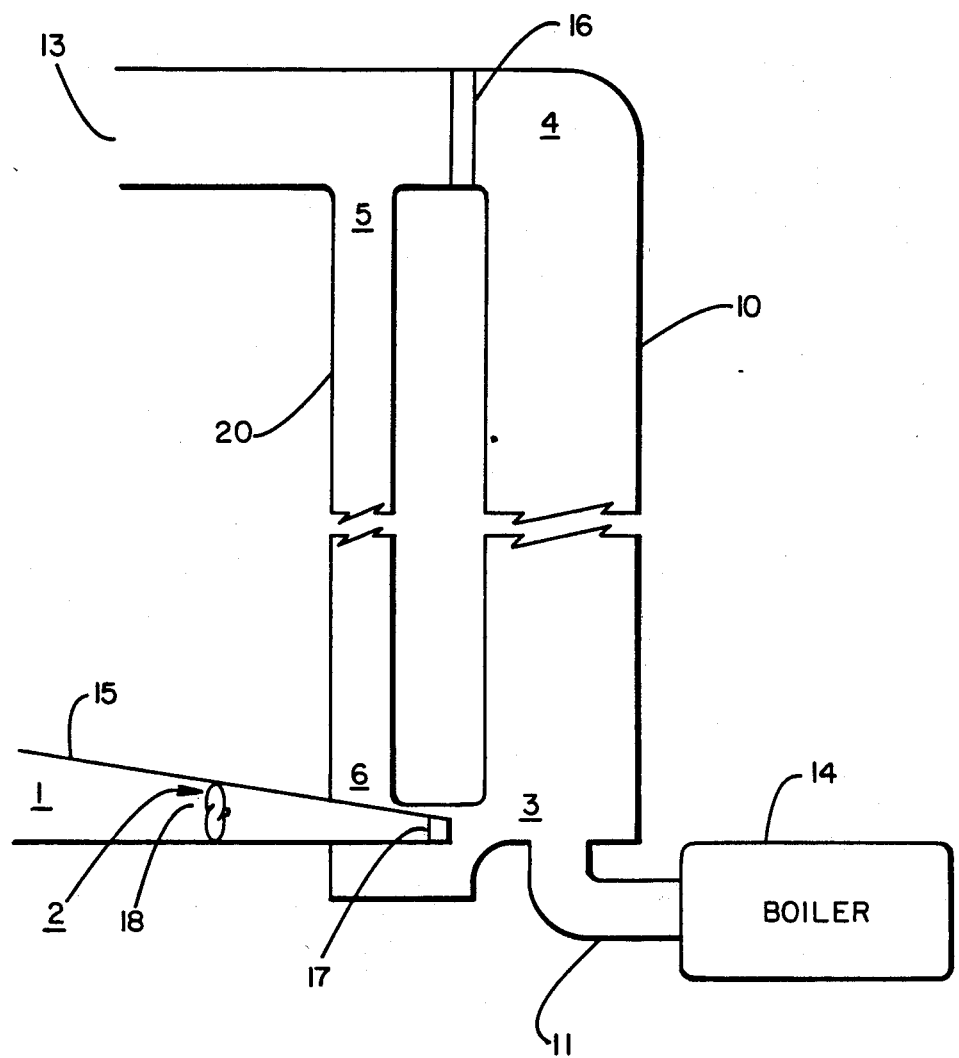
FIG. 3 is a schematic elevational view of a complete and preferred embodiment of my open cycle latent heat engine.

Understanding my open cycle latent heat engine best begins with an understanding of elevator 10, as shown in FIG. 1. Elevator 10 is a tube or chimney-like structure preferably rising several thousand feet from an entrance 12 at a lower level to an exit 13 at an upper level. Elevator 10 need not be vertical as illustrated and could be made to run from sea level to a nearby mountain top, for example. An existing mine shaft, or a shaft bored in a mountain for this purpose, are other possibilities. The main requirements are the capacity to allow air to rise adiabatically at a substantial rate from lower level 12 to upper level 13. In calculations that follow, I have selected 5,000 feet as the height for elevator 10, but other heights can also be made to work at different degrees of effectiveness.

A nozzle 15 admits ambient atmosphere at the lower level into entrance 12 of elevator 10, and a boiler 14 produces warm water vapor directed into entrance 12 via pipe 11 to mix with air in the lower region of elevator 10. Vapor from boiler 11 saturates the air at the lower region of elevator 10, and this reduces the density of the air and vapor mixture relative to the surrounding atmosphere, which is assumed to be less than fully saturated with water vapor. This causes the moist and less dense air within elevator 10 to rise toward exit 13; and as this occurs, ambient atmosphere flows into entrance 12 of elevator 10 through nozzle 15. The effect is similar to a chimney providing a draft that can draw in ambient atmosphere.

Elevator 10, of FIG. 1, simulates the rising moist air around a hurricane; and nozzle 15 simulates the throat of the hurricane, where swift winds move inward at sea level. Boiler 14 simulates the sun, which provides heat and water vapor to make the air flow.

By adding a few components, as shown in FIG. 2, my open cycle latent heat engine further simulates a hurricane. A condensate remover is arranged in an upper region of elevator 10 to remove condensed water from the air passing out through exit 13 of elevator 10. The air rising in elevator 10 is naturally cooled by adiabatic expansion to the higher elevation so that its water vapor tends to condense. Simple mechanical elements such as screens and collectors are arranged in the upper region of elevator 10 for removing the condensed water so that the air discharge from exit 13 is relatively dry. This simulates the rain fall that occurs when moist air swirls upward, condensing its water vapor into rain at higher altitudes around the eye of the hurricane.

Compressor passageway 20 is arranged to extend from an upper region of elevator 10 down to entrance 12 of elevator 10, and compressor passageway 20 receives a portion of the dry air leaving the upper region of elevator 10 and directs this dry air downward toward elevator entrance 12. The dry air is adiabatically compressed by gravity in compressor passageway 20 to a pressure less than ambient atmospheric pressure at the bottom of compressor passageway 20. Since condensation does not occur in the dry adiabatic compression in compressor passageway 20, the air there experiences a temperature change of 5.5° per thousand feet. During the wet adiabatic expansion process in elevator 10, where condensation does occur, the air and water vapor mixture experiences a temperature change of 3.5° per thousand feet. Using these rates as constants, the properties of the air-vapor mixture at the points A, B, C, and D of FIG. 2 appear in the following tables, which use symbols and calculational conditions as follows:

TABLE OF SYMBOLS

| M | Mass | M vapor + M air = M mixture |
|---|---|---|
| Q | Steam Quality | Q vapor — — |
| P | Pressure | P vapor + P air = P mixture |
| V | Volume | V vapor = V air = V mixture |
| T | Temperature | °F. = °R = (°F.)(°R) |
| $\rho$ | Density | $\rho$ vapor + $\rho$ air = $\rho$ mixture |
| S | Entropy | S vapor + S air = S mixture |
| H | Enthalpy | H vapor + H air = H mixture |

TABLE OF REFERENCE STATE CONDITIONS

|  | AIR | VAPOR |
|---|---|---|
| $T_0$ | 32° F. (491.6° R) | 32° F. |
| $P_0$ | 15#/in.² | .08854 |
| $V_0$ | 12.04055852 | 3306 |
| $H_0$ | 0 | 1075.8 |
| $S_0$ | 0 | 2.1877 |

| GAS CONSTANTS | AIR | WATER VAPOR |
|---|---|---|
| Cp | .241 | .47 |
| Cv | .173 | .36 |
| $k = \frac{Cp}{Cv}$ | 1.393063584 | 1.305555556 |
| R = J(Cp − Cv) | 52.904 | 85.58 |

TABLE A

|  |  | VAPOR | AIR | MIXTURE |
|---|---|---|---|---|
| SEA LEVEL AT ELEVATOR BASE | M | .022062178 | 1.000 | 1.022062178 |
|  | Q | SAT. |  |  |
|  | P | .5069 | 14.1931 | 14.7 |

TABLE A-continued

|  |  | VAPOR | AIR | MIXTURE |
|---|---|---|---|---|
| BASE | V |  | 13.96756483 |  |
|  | T | 80° F. | 539.6° R. |  |
|  | $\rho$ |  |  | .073173971 |
|  | S | .044918594 | .026212232 | .071130826 |
|  | H | 24.19338429 | 11.568 | 35.76138429 |
| WET ADIABATIC EXPANSION TO 62.5° F. | 80° F. − (3.5 × 5) = 62.5° F. |

TABLE B

|  |  | VAPOR | AIR | MIXTURE |
|---|---|---|---|---|
| 5000 FT. AT ELEVATOR TOP | M | .022062178 | 1.000 | 1.022062178 |
|  | Q | .729215872 |  |  |
|  | P | .28005 | 10.74484504 | 11.02489504 |
|  | V | 17.85169895 | 17.85169895 |  |
|  | T | 62.5° F. | 522.1° R. |  |
|  | S | .033937691 | .037193135 | .071130826 |
|  | H | 17.69680796 | 7.3505 | 25.04730796 |
| CONDENSATE REMOVED AT 62.5° F. |

TABLE C

|  |  | VAPOR | AIR | MIXTURE |
|---|---|---|---|---|
| 5000 FT. AT COMPRESSOR TOP | M | .016084061 | 1.000 | 1.016084061 |
|  | Q | SAT. |  |  |
|  | P | .28005 | 10.74484504 | 11.02489504 |
|  | V |  | 17.85169895 |  |
|  | T | 62.5° F. | 522.1° R. |  |
|  | $\rho$ |  |  | .056918059 |
|  | S | .033569043 | .037193135 | .070762178 |
|  | H | 17.51715049 | 7.3505 | 24.86765049 |
| DRY ADIABATIC COMPRESSION TO 90° F. | Rm = 53.42124339   Cpm = .244624946<br>Km = 1.390229568   Cvm = .175960109<br>62.5° F. + (5.5 × 5) = 90° F. |

TABLE D

|  |  | VAPOR | AIR | MIXTURE |
|---|---|---|---|---|
| SEA LEVEL AT COMPRESSOR BASE | M |  |  | 1.016084061 |
|  | Q | SUPERHEAT |  |  |
|  | P |  |  | 13.23718030 |
|  | V |  |  | 15.65134139 |
|  | T | 90° F. | 549.6° R. |  |
|  | $\rho$ |  |  | .064919935 |
|  | S |  |  | .070762178 |
|  | H |  |  | 31.70303698 |

As these tables show, the wet adiabatic expansion in elevator 10, followed by a condensate removal and a dry adiabatic compression in compressor 20, results in a substantial pressure reduction (from 14.7 pounds per square inch to 13.2 pounds per square inch) at region D at the bottom of compressor passageway 20. This reduces the pressure at the outflow end of nozzle 15 and speeds up the flow of ambient atmosphere into entrance 12 of elevator 10. The calculated properties of the resulting air flow are shown in the following tables corresponding to the numbered positions of FIG. 2.

Table 1 shows the properties of ambient atmosphere, assuming 13.273 pounds per square inch at the exhaust (2) of nozzle 15.

TABLE 1

|  |  | VAPOR | AIR | MIXTURE |
|---|---|---|---|---|
| SEA LEVEL AMBIENT | M | .013108859 | 1.000 | 1.013108859 |
|  | Q |  |  | 60.3% RH |

TABLE 1-continued

| ATMOSPHERE | P | .3056 | 14.3944 | 14.7 |
|---|---|---|---|---|
| | V | | 13.77223396 | |
| | T | 80° F. | 539.6° R. | |
| | Dew Point | | 524.6° R. | 65° F. |
| | S | .027434879 | .025254567 | .052689446 |
| | H | 14.38369554 | 11.568 | 25.95169554 |
| ADIABATIC EXPANSION TO 65° F. | Rm = 53.32680262 Km = 1.390739879 | | Cpm = .243963086 Cvm = .175419638 | |

Table 2 provides the properties of atmospheric air expanded to 65° F. (13.273 pounds per square inch approximately). Boiler 14 adds heat and vapor to bring the flowing mixture to 80° F., which is the same temperature assumed for the lower region of elevator 10 in previous Table A.

TABLE 2

| | | VAPOR | AIR | MIXTURE |
|---|---|---|---|---|
| SEA LEVEL NOZZLE THROAT | M | | | 1.013108859 |
| | Q | SUPERHEAT | | |
| | P | | | 13.29655514 |
| | V | | | 14.80263167 |
| | T | | | 65° F./524.6° R. |
| | S | | | .052689446 |
| | H | | | 22.24427808 |
| HEAT TO 80° F. AND SATURATE | | | | |

Table 3 shows the properties at the lower region of elevator 10.

TABLE 3

| | | VAPOR | AIR | MIXTURE |
|---|---|---|---|---|
| SEA LEVEL | M | .024483123 | 1.000 | 1.024483123 |
| | Q | SAT. | | |
| | P | .5069 | 12.78965514 | 13.29655514 |
| | V | | 15.50026504 | |
| | T | 80° F. | 539.6° R. | |
| | S | .049847638 | .033292343 | .083139981 |
| | H | 26.84819245 | 11.568 | 38.41619245 |
| WET ADIABATIC EXPANSION TO 5000 FT. | 80° F. − (3.5 × 5) = 62.5° F. | | | |

As the air and vapor mixture rises to the top of elevator 10, its properties are shown in Table 4.

TABLE 4

| | | VAPOR | AIR | MIXTURE |
|---|---|---|---|---|
| 5000 FT. TOP OF ELEVATOR | M | .024483123 | 1.000 | 1.024483123 |
| | Q | .737551898 | | |
| | P | .28005 | 9.570351694 | 9.850401694 |
| | V | 20.04249635 | 20.04249635 | |
| | T | 62.5° F. | 522.1° R. | |
| | S | .038075427 | .045064554 | .083139981 |
| | H | 19.86190365 | 7.3505 | 27.2124036 |
| REMOVE CONDENSATE AT 62.5° F. | | | | |

Only a small portion of the total flow from the upper region of elevator 10 passes into the top of compressor passageway 20, where the flow properties are shown in Table 5.

TABLE 5

| | | VAPOR | AIR | MIXTURE |
|---|---|---|---|---|
| 5000 FT. | M | .018057930 | 1.000 | 1.018057930 |

TABLE 5-continued

| TOP OF COMPRESSOR | Q | SAT. | | |
|---|---|---|---|---|
| | P | .28005 | 9.570351694 | 9.850401694 |
| | V | 20.04249635 | 20.04249635 | |
| | T | 62.5° F. | 522.1° R. | |
| | S | .037688705 | .045064554 | .082753259 |
| | H | 19.66689141 | 7.3505 | 27.01739141 |
| ADIABATIC COMPRESSION TO SEA LEVEL | Rm = 53.48359464 Km = 1.389894368 62.5° F. + (5.5 × 5) = 90° F. | | Cpm = .245061916 Cvm = .176316936 | |

This amount equals the mass of the air drawn into the exhaust of nozzle 15 at region 6 at the bottom of compressor passageway 20, the properties of the flow at region 6 being expressed in Table 6.

TABLE 6

| | | VAPOR | AIR | MIXTURE |
|---|---|---|---|---|
| SEA LEVEL BOTTOM OF COMPRESSOR | M | | | 1.018057930 |
| | Q | SUPERHEAT | | |
| | P | | | 11.82834753 |
| | V | | | 17.57067830 |
| | T | | | 90° F./549.6° R. |
| | S | | | .082753259 |
| | H | | | 33.87829015 |

The flow established for my open cycle latent heat engine as explained so far for FIG. 2 produces a pressure at base region (6) of compressor passageway 20 of about 13.24 pounds per square inch, down from 14.7 pounds per square inch in the ambient atmosphere at region (1).

Adding a mechanical condensate remover 17 to the throat region of nozzle 15 further speeds up the flow, as recalculated in the following Tables 1-6 corresponding to regions 1-6 of FIG. 3.

TABLE 1

| | | VAPOR | AIR | MIXTURE |
|---|---|---|---|---|
| SEA LEVEL AMBIENT ATMOSPHERE | M | .013108859 | 1.000 | 1.013108859 |
| | Q | | | 60.3% RH |
| | P | .3056 | 14.3944 | 14.7 |
| | V | | 13.72223396 | |
| | T | 80° F. | 539.6° R. | |
| | Dew Point | | 524.6° R. | 65° F. |
| | S | .027434879 | .025254567 | .052689446 |
| | H | 14.38369554 | 11.568 | 25.95169554 |
| DRY ADIABATIC EXPANSION FOLLOWED BY WET ADIABATIC EXPANSION | | | | |

TABLE 2

| | | VAPOR | AIR | MIXTURE |
|---|---|---|---|---|
| SEA LEVEL THROAT EXIT | M | .013108859 | 1.000 | 1.013108859 |
| | Q | .869673951 | | |
| | P | .2141 | 11.59098311 | 11.80508311 |
| | V | | 16.31080992 | |
| | T | 55° F. | 514.6° R. | |
| | S | .024137891 | .028551555 | .052689446 |
| | H | 12.41766174 | 5.543 | 17.96066174 |
| REMOVE CONDENSATE | | | | |

TABLE 3

| | | VAPOR | AIR | MIXTURE |
|---|---|---|---|---|
| SEA LEVEL ELEVATOR BASE | M | .011400580 | 1.000 | 1.011400580 |
| | Q | SAT. | | |
| | P | .2141 | 11.59098311 | 11.80508311 |

TABLE 3-continued

|   |   |   |   |   |
|---|---|---|---|---|
| V |   |   | 16.31080992 |   |
| T | 55° F. |   | 514.6° R. |   |
| S | .024059784 |   | .028551555 | .052611339 |
| H | 12.37874985 |   | 5.543 | 17.92174985 |
| WET ADIABATIC EXPANSION | 55° F. − (3.5 × 5) = 37.5° F. | | | |

TABLE 4

|  |  | VAPOR | AIR | MIXTURE |
|---|---|---|---|---|
| 5000 FT. ELEVATOR TOP | M | .011400580 | 1.000 | 1.011400580 |
|  | Q | .683834240 |  |  |
|  | P | .110385 | 9.135081581 | 9.245466581 |
|  | V |  | 19.99205098 |  |
|  | T | 37.5° F. | 497.1° R. |  |
|  | S | .016206903 | .036404436 | .052611339 |
|  | H | 8.059161141 | 1.3255 | 9.38466141 |
| REMOVE CONDENSATE |   |   |   |   |

TABLE 5

|  |  | VAPOR | AIR | MIXTURE |
|---|---|---|---|---|
| 5000 FT. COMPRESSOR TOP | M | .007454158 | 1.000 | 1.007454158 |
|  | Q | SAT. |  |  |
|  | P | .110385 | 9.135081581 | 9.245446581 |
|  | V |  | 19.99205058 |  |
|  | T | 37.5° F. | 497.1° R. |  |
|  | S | .016162850 | .036404436 | .052567286 |
|  | H | 8.037072844 | 1.3255 | 9.362572844 |
| DRY ADIABATIC COMPRESSION | Rm = 53.14576987  Cpm = .242694372  K = 1.391726933  Cvm = .174383614  37.5° F. + (5.5 × 5) = 65° F. | | | |

TABLE 6

|  |  | VAPOR | AIR | MIXTURE |
|---|---|---|---|---|
| SEA LEVEL COMPRESSOR BOTTOM | M |  |  | 1.007454158 |
|  | Q | SUPERHEAT |  |  |
|  | P |  | 11.19459527 |  |
|  | V |  | 17.42454196 |  |
|  | T |  | 65° F./524.6° R. |  |
|  | S |  |  | .052567286 |
|  | H |  |  | 16.08641783 |

For steady operation and energy extraction, a turbo generator 18, or other energy-extracting device, is added into the throat region of nozzle 15, and a mechanical condensate remover 17, which might also be accomplished by turbo generator 18, is also arranged at the throat region of nozzle 15. The calculations modified to include the mass of air and vapor flowing from compressor passageway 20 to join the flow through nozzle 15 are included in the following Tables 1-6, corresponding to regions 1-6 of FIG. 3.

TABLE 1

|  |  | VAPOR | AIR | MIXTURE |
|---|---|---|---|---|
| SEA LEVEL AMBIENT ATMOSPHERE | M | .013108859 | 1.000 | 1.013108859 |
|  | Q |  |  | 60.3% RH |
|  | P | .3056 | 14.3944 | 14.7 |
|  | V |  | 13.77223396 |  |
|  | T | 80° F. | 539.6° R. |  |
|  | Dew Point |  | 524.6° R. | 65° F. |
|  | S | .027434879 | .025254567 | .052689446 |
|  | H | 14.38369554 | 11.568 | 25.95169554 |
| ADIABATIC EXPANSION |   |   |   |   |

TABLE 2

|  |  | VAPOR | AIR | MIXTURE |
|---|---|---|---|---|
| SEA LEVEL THROAT EXIT | M | .013108859 | 1.000 | 1.013108859 |
|  | Q | .869673951 |  |  |
|  | P | .2141 | 11.59098311 | 11.80508311 |
|  | V |  | 16.31080992 |  |
|  | T | 55° F. | 514.6° R. |  |
|  | S | .024137891 | .028551555 | .052689446 |
|  | H | 12.41766174 | 5.543 | 17.96066174 |
| REMOVE CONDENSATE |   |   |   |   |

TABLE 2A

| SEA LEVEL THROAT EXIT | | | |
|---|---|---|---|
|  | VAPOR | AIR | MIXTURE |
| M | .011400580 | 1.000 | 1.011400580 |
| Q | SAT. |  |  |
| P | .2141 | 11.59098311 | 11.80508311 |
| V |  | 16.31080992 |  |
| T | 55° F | 514.6° R |  |
| S | .024059784 | .028551555 | .052611339 |
| H | 12.37874985 | 5.543 | 17.92174985 |

At this point in the system,
1# (dry air from nozzle) mixes with .05# (dry air from compressor)

$$Mm = \left(1.011400580 + \frac{.1007454158}{2}\right) \div 1.05 = 1.011212655$$

$$Sm = \left(0.52611339 + \frac{.0052567286}{2}\right) \div 1.05 = 0.52609241$$

TABLE 3

|  |  | VAPOR | AIR | MIXTURE |
|---|---|---|---|---|
| SEA LEVEL ELEVATOR BASE | M | .011212655 | 1.000 | 1.011212655 |
|  | Q | .994255955 |  |  |
|  | P | .20642 | 11.42837772 | 11.634797720 |
|  | V | 16.51073652 | 16.51073651 |  |
|  | T | 54° F. | 513.6° R. |  |
|  | S | .023565767 | .029043474 | .052609241 |
|  | H | 12.10139647 | 5.302 | 17.40339647 |
| WET ADIABATIC EXPANSION | 54° F. − (3.5 × 5) = 36.5° F. | | | |

TABLE 4

|  |  | VAPOR | AIR | MIXTURE |
|---|---|---|---|---|
| 5000 FT. ELEVATOR TOP | M | .011212655 | 1.000 | 1.011212655 |
|  | Q | .647434622 |  |  |
|  | P | .10611 | 9.016537294 | 9.122647294 |
|  | V | 20.21414893 | 20.21414894 |  |
|  | T | 36.5° F. | 496.1° R. |  |
|  | S | .015801906 | .036807335 | .052609241 |
|  | H | 7.842428940 | 1.0845 | 8.926928940 |
| REMOVE CONDENSATE |   |   |   |   |

TABLE 5

|  |  | VAPOR | AIR | MIXTURE |
|---|---|---|---|---|
| 5000 FT. COMPRESSOR TOP | M | .007259526 | 1.000 | 1.007259526 |
|  | Q | SAT. |  |  |
|  | P | .10611 | 9.016537294 | 9.122647294 |
|  | V |  | 20.21414894 |  |
|  | T | 36.5° F. | 496.1° R. |  |
|  | S | .015765875 | .036807335 | .052573210 |
|  | H | 7.824316656 | 1.0845 | 8.908816656 |
| ADIABATIC COMPRESSION | Rm = 53.13950262  Cpm = .242650450  K = 1.391761314  Cvm = .174347747 | | | |

TABLE 5-continued 36.5° F. + (5.5 × 5) = 64° F.

TABLE 6
SEA LEVEL COMPRESSOR BOTTOM

|   | VAPOR | AIR | MIXTURE |
|---|---|---|---|
| M |  |  | 1.007259526 |
| Q | SUPERHEAT |  |  |
| P |  |  | 11.04992087 |
| V |  |  | 17.61357806 |
| T |  |  | 64° F./523.6° R |
| S |  |  | .052573210 |
| H |  |  | 15.63014426 |

$$Mm = \left(1.011400580 + \frac{.1007259526}{2}\right) \div 1.05 = 1.011203387$$

$$Sm = \left(0.52611339 + \frac{.0052573210}{2}\right) \div 1.05 = .052609523$$

These Tables show that the newly calculated quantities change so little that it is reasonable to assume that the open cycle latent heat engine has stabilized with the operating properties shown in the above Tables 1-6. Turbo generator 18 can then extract work from an air flow rate at 425 miles per hour, yielding 3.94 btu per pound of dry air.

Figure 4:
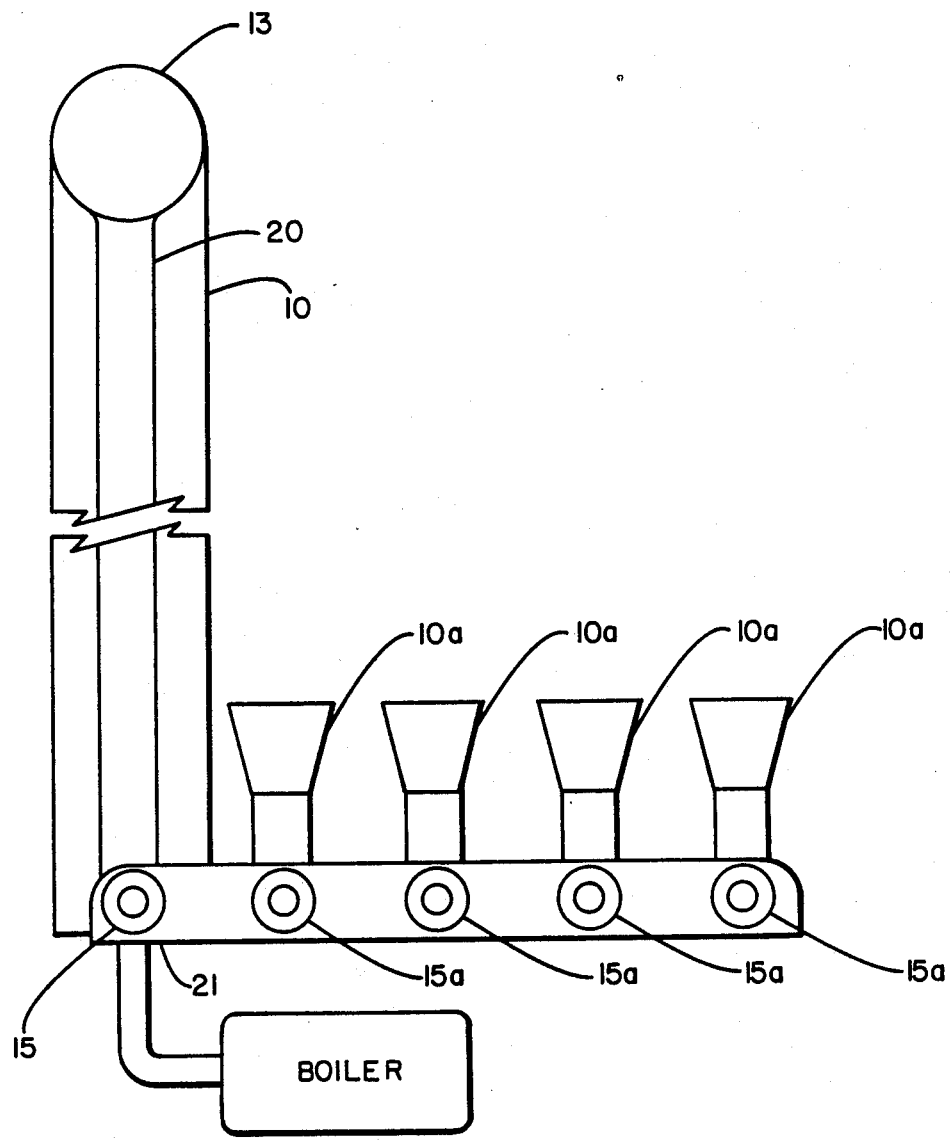
FIG. 4 is a schematic elevational view of an embodiment of my open cycle latent heat engine wherein a single compressor passageway sustains air flow through several ejectors.

My open cycle latent heat engine can be expanded to power several ejectors, as shown in FIG. 4. The low pressure produced at the bottom of compressor passageway 20 is applied to a header 21 in communication with the throat or exhaust ends of a plurality of nozzles 15a, in addition to the primary nozzle 15 directing air flow into the entrance of elevator passageway 10. Each ejector nozzle 15a then directs a flow of ambient atmosphere into a shortened elevator passageway 10a; and elevators 10a can rise a few hundred feet, for example, rather than several thousand feet, as preferred for elevator 10.

Once the thermodynamics of my open cycle latent heat engine are fully understood, it will become apparent that it can be used in a variety of ways for extracting energy from air flowing through the engine. It can also be used to direct large air flows for atmospheric cleaning and other thermodynamic purposes.

I claim:

1. An open cycle latent heat engine comprising:
    a. an elevator passageway having an entrance at a lower level and an exit at a higher level having a substantially higher elevation than said lower level;
    b. means for inputting warm water vapor into said lower level of said elevator passageway to produce a wet adiabatic expansion of moist air rising in said passageway;
    c. a condensate remover in the region of said exit from said elevator, said condensate remover being arranged for removing water condensed from said vapor at said higher elevation of said exit;
    d. a compressor passageway descending from the region of said elevator passageway exit to the region of said elevator passageway entrance, said compressor passageway being arranged for receiving a portion of the air discharged from said elevator exit for adiabatically and gravitationally compressing dry air descending in said compressor passageway;
    e. an ejector arranged at a lower region of said compressor passageway;
    f. said ejector having a nozzle receiving ambient atmosphere flowing through said nozzle and directed into said entrance of said elevator passageway, said dry air compressed in said compressor passageway having a subatmospheric pressure at said lower region of said compressor passageway and being drawn into said ejector to help sustain the flow of ambient atmosphere through said ejector nozzle, the combined flow of ambient and compressor passageway air from said ejector being directed into said entrance of said elevator passageway, to rise in said elevator passageway; and
    g. means for extracting energy from the air circulation flow established by said elevator passageway, said compressor passageway, and said ejector.

2. The engine of claim 1 including a plurality of ejectors arranged for receiving subatmospheric pressure dry air from said lower region of said compressor passageway, atmospheric pressure air being arranged for flowing through said nozzles of each of said ejectors.

3. A method of operating an open cycle latent heat engine, said method comprising:
    a. inputting warm vapor into air at a lower region of an elevator passageway so that said air in said elevator passageway becomes vapor-saturated and rises adiabatically to a substantial altitude above said lower region;
    b. removing condensate from said air rising to an upper region of said elevator passageway;
    c. discharging said adiabatically expanded air to atmosphere at an upper region of said elevator passageway at said substantial altitude;
    d. directing a portion of the dry air discharged from said upper region of said elevator passageway into an upper region of a compressor passageway leading back down to said lower region of said elevator passageway so that dry air in said compressor passageway adiabatically compresses to a subatmospheric pressure at a lower region of said compressor;
    e. directing atmospheric air at the level of said lower region of said elevator through a nozzle of an ejector and into said lower region of said elevator passageway;
    f. directing adiabatically and gravitationally compressed air at subatmospheric pressure from said lower region of a compressor passageway into said ejector to help sustain flow of said atmospheric air through said ejector nozzle and into said lower region of said elevator passageway; and
    g. extracting energy from the air flow established by said elevator passageway, said compressor passageway, and said ejector.

4. The method of claim 3 including directing said subatmospheric pressure dry air from said lower region of said compressor passageway to a plurality of said ejectors arranged for receiving atmospheric air flows.

* * * * *